United States Patent [19]
Aks et al.

[11] Patent Number: 5,684,396
[45] Date of Patent: Nov. 4, 1997

[54] LOCALIZING MAGNETIC DIPOLES USING SPATIAL AND TEMPORAL PROCESSING OF MAGNETOMETER DATA

[75] Inventors: Stanley O. Aks, Cerritos; Kirk Kohnen, Fullerton, both of Calif.

[73] Assignee: Hughes Aircraft Company, Los Angeles, Calif.

[21] Appl. No.: 611,352

[22] Filed: Mar. 5, 1996

[51] Int. Cl.$^6$ .................................................. G01R 33/02
[52] U.S. Cl. .............. 324/207.13; 324/244; 324/207.14; 324/207.26; 364/559
[58] Field of Search ......................... 324/207.13, 207.14, 324/207.11, 207.22, 207.26, 244, 247; 364/423.098, 449.1, 556, 559, 424.012; 340/988, 995

[56] References Cited

U.S. PATENT DOCUMENTS 5,239,474  8/1993  Eaton, Jr. et al. .................. 324/207.14
5,381,095  1/1995  Andrews ................................. 324/244

OTHER PUBLICATIONS

Keiichi Mori, "Application of Weight Functions to the Magnetic Localization of an Object", printed in the IEEE Transactions on Magnetics 25 (1989) May, No. 3, New York, U.S., pp. 2726–2731.

Primary Examiner—Sandra L. O'Shea
Assistant Examiner—J. M. Patidar
Attorney, Agent, or Firm—M. E. Lachman; M. W. Sales; W. K. Denson-Low

[57] ABSTRACT

Processing methods and apparatus that process magnetometer data derived from an array of magnetometer sensors and outputs both the position and velocity of a magnetic dipole. In the method and apparatus, (a) a set of actual magnetic field measurements of a magnetic dipole is collected using the array of magnetic sensors. Then (b), a trajectory for the magnetic dipole is hypothesized. Then (c), a set of estimated magnetic field measurements is determined that would be formed by a magnetic dipole moving along the hypothesized trajectory. Then (d), the actual magnetic field measurements are compared with the estimated magnetic field measurements. Then (e), based on the comparison, a new trajectory for the magnetic dipole is hypothesized. Steps (c) through (e) are repeated until agreement between the actual magnetic field measurements and the estimated magnetic field measurements is deemed sufficiently close. The trajectory is displayed for viewing on a display.

7 Claims, 3 Drawing Sheets

LOCALIZING MAGNETIC DIPOLES USING SPATIAL AND TEMPORAL PROCESSING OF MAGNETOMETER DATA

BACKGROUND

The present invention relates generally to magnetometer data processing methods and apparatus for localizing magnetic dipoles, and more particularly, to methods and apparatus that employs spatial and temporal processing of magnetometer data to localize magnetic dipoles and provide both the position and velocity of the dipole.

Metal objects such as firearms, automobiles, ships, and submarines, for example, have magnetic dipole moments that may be used to detect them. Historically, magnetic field sensors have been used to detect (but not locate) such objects. Magnetic dipole detectors developed by the assignee of the present invention have been used to localize objects in two ways. One implementation uses a single sensor and data is sensed over a period of time to localize the magnetic dipole. The other implementation uses an array of sensors, and a local time average of each sensor output is determined. This data is processed to determine the location (but not the velocity) of the dipole. This second technique makes an implicit assumption that the dipole of interest is relatively stationary while the measurements are being taken.

Prior art relating to the present invention is disclosed in U.S. Pat. No. 5,239,474 entitled "Dipole Moment Detection and Localization" assigned to the assignee of the present invention. This patent discloses a dipole moment detection and localization algorithm that is used to process magnetometer data to localize magnetic dipoles. However, the algorithm described this patent does not provide an indication of the velocity of the dipole as a direct output thereof. The present invention provides for a processing method or algorithm that improves upon the teachings of this patent.

Accordingly, it is an objective of the present invention to provide for methods and apparatus that employs spatial and temporal processing of magnetometer data to localize magnetic dipoles and provides both the position and velocity of the dipole.

SUMMARY OF THE INVENTION

To meet the above and other objectives, the present invention provides for processing methods and apparatus that processes magnetometer data derived from an array of magnetometer sensors and outputs both the position and the velocity of a magnetic dipole as a direct output thereof. A physically distributed array of magnetometer sensors is used to sense the magnetic signature of a magnetic dipole. A set of magnetometer readings derived from the physically distributed array of magnetometer sensors is sampled over a predetermined period of time. The set of magnetometer readings is processed to estimate the trajectory (including both the location and the velocity) of the magnetic dipole. The present invention processes data from the magnetic sensors, taking into account changes in the measurements due to the motion of the magnetic dipole. Consequently, the immunity to noise of the present invention is greater than that of previously developed algorithms or apparatus.

In the present invention, (a) a set of actual magnetic field measurements of a magnetic dipole is collected using a plurality of magnetic sensors. Then (b), a trajectory for the magnetic dipole is hypothesized. Then (c), a set of estimated magnetic field measurements is determined that would be formed by a magnetic dipole moving along the hypothesized trajectory. Then (d), the actual magnetic field measurements are compared with the estimated magnetic field measurements. Then (e), based on the comparison, a new trajectory for the magnetic dipole is hypothesized. Steps (c) through (e) are repeated until agreement between the actual magnetic field measurements and the estimated magnetic field measurements is deemed sufficiently close.

The processing method and apparatus of the present invention provides for a substantial improvement over the processing technique described in U.S. Pat. No. 5,239,474. The present processing method and apparatus provides an estimate of both the position and the velocity of the magnetic dipole that is tracked. In many applications, such as when tracking vehicles, for example, knowing the velocity of the magnetic dipole is of primary importance. Additionally, the present processing method and apparatus has better noise immunity than the prior art invention described in U.S. Pat. No. 5,239,474 applied to a single time slice, or to a set of time-averaged data.

The spatial and temporal processing methods and apparatus of the present invention may be used with any system intended to passively detect, locate, and classify objects using their magnetic fields. The present processing method or algorithm may be employed in non-acoustic anti-submarine surveillance and warfare systems, airport ground-traffic control systems, highway traffic monitoring systems, and personal weapon detection systems, and may provide for clandestine monitoring of military activity behind enemy lines, for example.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
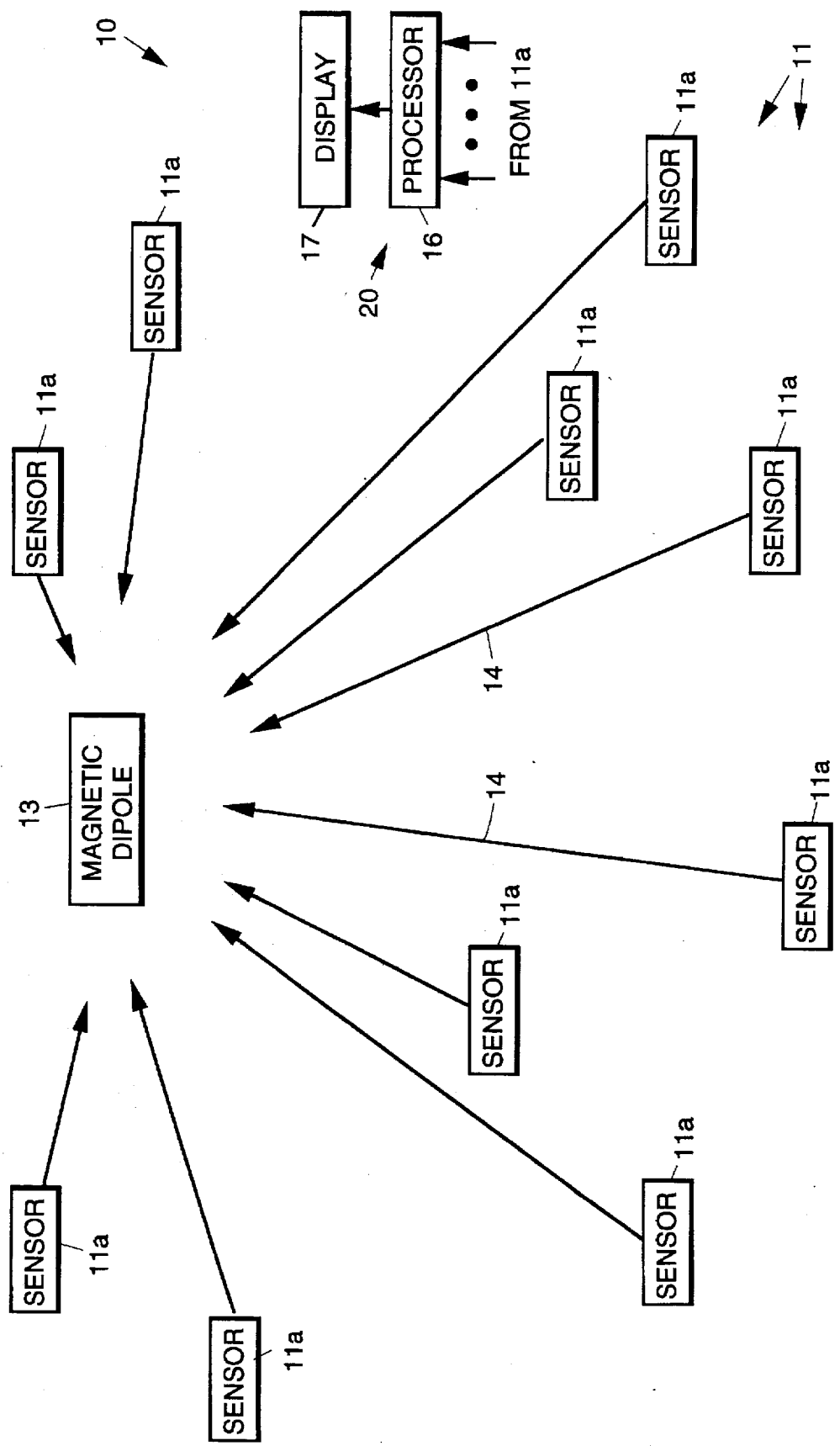
FIG. 1 shows magnetic dipole detection apparatus in accordance with the principles of the present invention.

Referring to the drawing figures, FIG. 1 shows magnetic dipole detection apparatus 10 in accordance with the principles of the present invention. The magnetic dipole detection apparatus 10 comprises an arbitrarily positioned array of magnetic sensors 11 that is coupled to processing apparatus 16 that implements processing methods 20 in accordance with the present invention. The sensors 11 of the array of magnetic sensors 11 may be coupled to the processing apparatus 16 by means of hard wire coupling, an RF data link, a microwave data link, or other appropriate means. A magnetic dipole 13 (or target 13) is located within the detection range of the array of magnetic sensors 11. A plurality of arrows representing magnetic vectors 14 are shown extending from each sensor 11 a of the array of magnetic sensors 11 toward the location of the moving dipole 13. The readings from each sensor 11 comprise a set of data that are indicative of the location of the dipole 13 during the period of time during which the sensor data is gathered for analysis. The processing method 20 or algorithm described herein provides a technique whereby the motion of the target is approximated by constant velocity motion for each subset of collected data and then the actual positions of the dipole 13 that correspond to this motion are estimated. The sensor data from the array of magnetic sensors 11 is processed in the processing apparatus 16 to generate position and velocity information regarding the dipole 13 and this data is subsequently displayed for viewing on a display 17.

Figure 2:
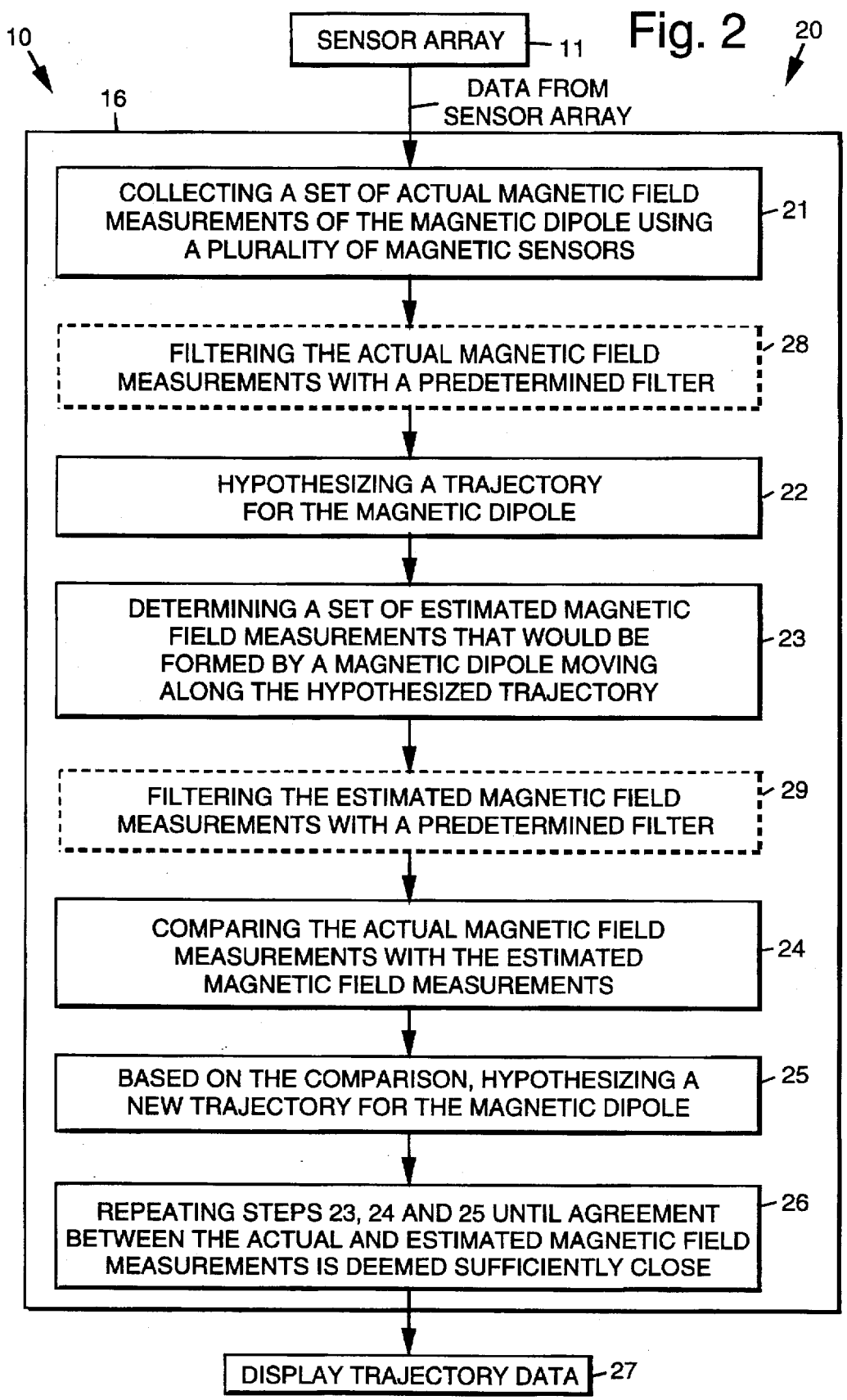
FIG. 2 shows a flow diagram illustrating a processing method or algorithm in accordance with the present invention employed in the apparatus of FIG. 1.

FIG. 2 shows a flow diagram illustrating a processing method 20 or algorithm in accordance with the present invention employed in the apparatus 10 of FIG. 1. The processing method 20 is implemented in the processing apparatus 16 and comprises the following steps. The first step (a) involves collecting 21 a set of actual magnetic field measurements of the magnetic dipole 13 using a plurality of magnetic sensors 11. Optionally, the actual magnetic field measurements may be filtered by a predetermined filter, as shown in step 28. In the next step (b), a trajectory for the magnetic dipole 13 is hypothesized 22. In the next step (c), a set of estimated magnetic field measurements is determined 23 that would be formed by a magnetic dipole moving along the hypothesized trajectory. In the event that the actual magnetic field measurements have been filtered by a predetermined filter, the estimated magnetic field measurements are also filtered by the predetermined filter as shown in step 29. Then in the next step (d) the actual magnetic field measurements (or filtered actual measurements) are compared 24 with the estimated magnetic field measurements (or filtered estimated measurements). Then in step (e), based on the comparison, a new trajectory for the magnetic dipole is hypothesized 25. Steps c) through e) are repeated 26 until agreement between the actual magnetic field measurements and the estimated magnetic field measurements is deemed sufficiently close. The trajectory is displayed 27 for viewing on a display 17.

The spatial and temporal processing performed by the present invention is mathematically described as follows. The magnetic field at a point in space due to the presence of the magnetic dipole 13 is given by the basic equation:

$$\underline{B} = 1/r^5 \ [3(\underline{m}\cdot\underline{r})\underline{r} - r^2\underline{m}] \quad [1]$$

where: $\underline{B}$ is the magnetic field vector, given by:

$$\underline{B} = B_x\underline{i} + B_y\underline{j} + B_z\underline{k} \quad [2]$$

$\underline{m}$ is the dipole moment vector, given by:

$$\underline{m} = m_x\underline{i} + m_y\underline{j} + m_z\underline{k} \quad [3]$$

$\underline{r}$ is the position vector, given by:

$$\underline{r} = r_x\underline{i} + r_y\underline{j} + r_z\underline{k} \quad [4]$$

$\underline{r}(t)$ is the position in the magnetic field with respect to the position of the dipole moment, given by:

$$\underline{r} = \underline{r}_s - \underline{r}_d(t) \quad [5]$$

$\underline{r}_s$ is the position at which the magnetic field equals B, and $\underline{r}_d(t)$ is the position of dipole moment at time t.

After substituting the vector components and simplifying, the basic equation becomes:

$$\underline{B} = \frac{1}{r^5} \begin{vmatrix} (2r_x^2 - r_y^2 - r_z^2)m_x + (3r_xr_y)m_y + (3r_xr_z)m_z \\ (3r_xr_y)m_x + (2r_y^2 - r_x^2 - r_z^2)m_y + (3r_yr_z)m_z \\ (3r_xr_z)m_x + (3r_yr_z)m_y + (2r_z^2 - r_x^2 - r_y^2)m_z \end{vmatrix} \quad [6]$$

where:

$$r^5 = (r_x^2 + r_y^2 + r_z^2)^{5/2} \quad [7]$$

The position matrix may be defined as:

$$[R] = \frac{1}{r^5} \begin{vmatrix} 2r_x^2 - r_y^2 - r_z^2 & 3r_xr_y & 3r_xr_z \\ 3r_xr_y & 2r_y^2 - r_x^2 - r_z^2 & 3r_yr_z \\ 3r_xr_z & 3r_yr_z & 2r_z^2 - r_x^2 - r_y^2 \end{vmatrix} \quad [8]$$

Then, by substitution:

$$\underline{B} = [R]\underline{m} \quad [9].$$

The position matrix, R, is a function of the relative positions of the magnetic dipole 13 and the point in space where the magnetic field equals $\underline{B}$.

Assume that the array of magnetic sensors 11 is arbitrarily arranged in three-dimensional space such as is shown in FIG. 1. Each sensor of the array 11 measures the three components of the local magnetic field. The sensors of the array 11 are oriented so that their respective axes are parallel to each other. Further assume that the dipole 13 is moving along a trajectory in three-dimensional space given by:

$$\underline{r}_d(t) = (x_0 + v_x t)\underline{i} + (y_0 + v_y t)\underline{j} + (z_0 + v_z t)\underline{k} \quad [10]$$

Define the measurements of the magnetic field at the array of sensors 11 by a composite vector $$\underline{B}_R = \begin{vmatrix} \underline{B}_{11} \\ \underline{B}_{21} \\ \ldots \\ \underline{B}_{N1} \\ \underline{B}_{12} \\ \underline{B}_{22} \\ \ldots \\ \underline{B}_{N2} \\ \ldots \\ \underline{B}_{NT} \end{vmatrix} \quad [11]$$

where N is the number of sensor data channels, and T is number of times the sensors 11 are sampled.

The position matrix for the array 11 may be defined by the composite matrix:

$$[\underline{R}_R] = \begin{vmatrix} R_{11} \\ R_{21} \\ \ldots \\ R_{N1} \\ R_{12} \\ R_{22} \\ \ldots \\ R_{N2} \\ \ldots \\ R_{NT} \end{vmatrix} \quad [12]$$

Then for the array, the expansion of equation 9 becomes:

$$\underline{B}_R = [\underline{R}_R]\underline{m} \quad [13].$$

If $\underline{B}_R$ is a set of measurements representing the field of a single magnetic dipole 13 moving along an assumed trajectory $\underline{r}_d(t) = (x_0 + v_x t)\underline{i} + (y_0 + v_y t)\underline{j} + (z_0 + v_z t)\underline{k}$, solving equation 13 for $\underline{m}$ provides an estimate of the magnetic dipole vector. It is to be understood that the trajectory of the dipole 13 is not limited to this form, but may be any continuous function. At this point, assume that other significant magnetic sources, such as the earth's magnetic field and local geomagnetic distortions, have been subtracted from the measurements. Define the pseudo-inverse of the array position matrix as:

$$[\hat{R}_R] = [[R_R]^T[R_R]]^{-1}[R_R]^T \quad [14].$$

Then the estimated dipole vector is:

$$\underline{m}_{est} = [\hat{R}_R]\underline{B}_R \quad [16].$$

The correlation coefficient will now be derived. The goodness of the estimated dipole vector of the magnetic dipole 13 is evaluated as the correlation coefficient between actual sensor measurements and ideal sensor measurements derived from the estimated dipole vector. Define the set of ideal measurements as $$\underline{B}_I = [\hat{R}_R]\underline{m}_{est} \quad [17].$$

By subtracting the mean from the sets of actual and ideal measurements, zero-mean vectors are obtained that are given by:

$$\underline{B}_{R0} = \underline{B}_R - \frac{1}{N} \Sigma \underline{B}_R, \text{ and} \quad [17]$$

$$\underline{B}_{I0} = \underline{B}_I - \frac{1}{N} \underline{B}_I. \quad [18]$$

Then, the correlation coefficient is:

$$\rho = \frac{\underline{B}_{R0}^T \underline{B}_{I0}}{\sqrt{(\underline{B}_{R0}^T \underline{B}_{R0})(\underline{B}_{I0}^T \underline{B}_{I0})}} \quad [19]$$

The estimate of measurements will now be discussed. $\underline{B}_I$ is an estimate of the realizable measurements at the sensors that best fits the actual sensor measurements $\underline{B}_R$. If the expression for $\underline{m}_{est}$ is substituted into the equation for $\underline{B}_I$, a direct estimate of the ideal measurements is obtained:

$$\underline{B}_I = R_R[\hat{R}_R]\underline{B}_R \quad [20].$$

Define the measurement estimation matrix:

$$S = R_R[\hat{R}_R] \quad [21]$$

which, in expanded form is:

$$S = [R_R][[R_R]^T[R_R]]^{-1}[R_R]^T \quad [22].$$

Then, substituting equation 21 into equation 20 yields:

$$\underline{B}_I = [S]\underline{B}_R \quad [23].$$

S is a function of sensor positions and hypothesized dipole position. It has the properties of being symmetrical and optimal in that:

$$[S] = [S]^T \quad [24],$$

and $$[S] = [S]^2 \quad [25].$$

Equation 24 shows that the estimator S, when applied to an ideal set of measurements, $\underline{B}_I$, reproduces the set of ideal measurements as an optimal estimate.

To estimate the trajectory of the dipole 13, the value of:

$$\rho = \frac{\underline{B}_{R0}^T \underline{B}_{I0}}{\sqrt{(\underline{B}_{R0}^T \underline{B}_{R0})(\underline{B}_{I0}^T \underline{B}_{I0})}} \quad [26]$$

is maximized by varying the values of six parameters that define the trajectory of the dipole 13 which are given by:

$$(x_0, Y_0, z_0, v_x, v_y, v_z) \quad [27]$$

In the case of multiple dipoles 13, the linear form of the dipole estimator equation simplifies the simultaneous processing of data derived from the multiple dipoles 13. Assume two magnetic dipoles 13, $\underline{m}_1$ and $\underline{m}_2$, at two different positions characterized by $R_1$ and $R_2$. Assume that the same array of sensors 11 is used to measure both $\underline{m}_1$ and $\underline{m}_2$. Because equation 9 is linear, and because magnetic fields may be linearly summed, the effects of the two dipoles 13 on the sensor measurements may be linearly summed:

$$\underline{B} = [R_1]\underline{m}_1 + [R_2]\underline{m}_2 \quad [28]$$

which may be simplified to:

$$\underline{B} = |R_1 \; R_2| \begin{vmatrix} \underline{m}_1 \\ \underline{m}_2 \end{vmatrix}. \quad [29]$$

Equation 26 shows that multiple dipoles 13 at hypothesized locations may be estimated simultaneously from one set of measurements. In the general case, define:

$$\underline{m}_T = \begin{vmatrix} \underline{m}_1 \\ \underline{m}_2 \\ \ldots \\ \underline{m}_M \end{vmatrix} \quad [30]$$

where M is the numbers of dipoles 13, and also define:

$$[R_T] = |R_1 \; R_2 \ldots R_m| \quad [31].$$

Then equation 29 becomes:

$$\underline{B} = [R_T]\underline{m}_T \quad [32].$$

This leads to the simultaneous estimation of the locations of M dipole sources:

$$\underline{m}_{T est} = [\hat{R}_T]\underline{B} \quad [33]$$

where $\hat{R}_T$ is the pseudo-inverse of $R_T$ as in equation 14.

As was stated above, the present method 20 also envisions filtering the actual and estimated magnetic filed measurements, which filters the measurements against noise. In the filtering embodiment, the collected data is multiplied by a square matrix that embodies a filter that reduces the effect of noise. The magnetic field vectors that result from the hypothesized dipole trajectory are multiplied by the same square matrix. The matrix is selected to improve the performance of the method against the noise.

The following equations describe the present method 20 with filtering:

$$FB_R = FR_R m,$$

$$R^T F^T FB_R = R^T F^T FRm,$$

$$\hat{m} = (R^T F^T FR)^{-1} R^T F^T FB_R,$$

$$FB_I = FR(R^T F^T FR)^{-1} R^T F^T FB,$$

$$B_{RO} = FB_R - (1/n)\Sigma FB_R,$$

$$B_{IO} = FB_I - (1/n)\Sigma FB_I,$$

and $$\rho = \frac{B_{RO}^T B_{IO}}{\sqrt{B_{RO}^T B_{RO} \, B_{IO}^T B_{IO}}}.$$

Figure 3:
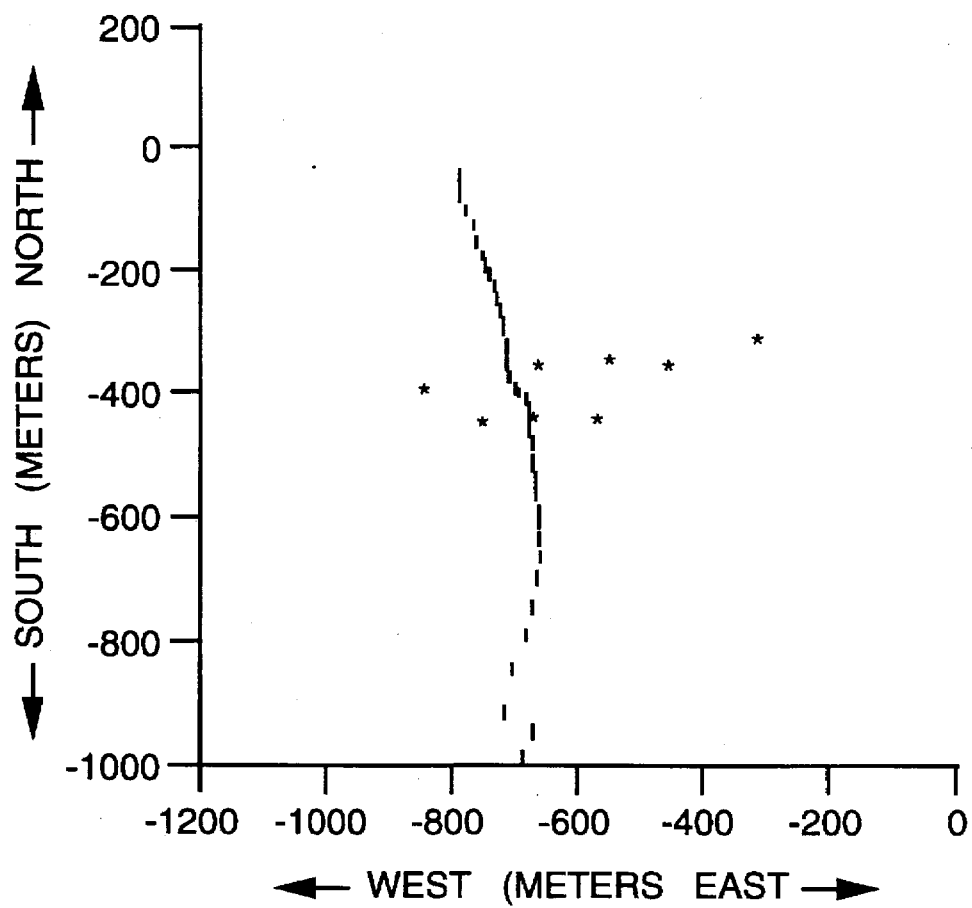
FIG. 3 shows a track that results from using the present invention.

FIG. 3 shows a track that results from processing magnetometer data using the present method 20. Using an array of eight 3-axis magnetometers, the spatial temporal processing method 20 of the present invention provides a three-dimensional track of a dipole 13, such as for a large cruise ship for the example shown in FIG. 1.

Thus, improved methods and apparatus that employ spatial and temporal processing of magnetometer data to localize magnetic dipoles and output trajectory data regarding the dipole have been disclosed. It is to be understood that the described embodiments are merely illustrative of some of the many specific embodiments which represent applications of the principles of the present invention. Clearly, numerous and varied other arrangements may be readily devised by those skilled in the art without departing from the scope of the invention.

What is claimed is:

1. A method of detecting and localizing a magnetic dipole using an array of spatially distributed magnetic sensors, said method comprising the steps of:
   a) collecting a set of actual magnetic field measurements of a magnetic dipole using a plurality of magnetic sensors;
   b) hypothesizing a trajectory for the magnetic dipole;
   c) determining a set of estimated magnetic field measurements that would be formed by a magnetic dipole moving along the hypothesized trajectory;
   d) comparing the actual magnetic field measurements with the estimated magnetic field measurements;
   e) based on the comparison, hypothesizing a new trajectory for the magnetic dipole; and
   f) repeating steps c) through e) until agreement between the actual magnetic field measurements and the estimated magnetic field measurements is deemed sufficiently close.

2. The method of claim 1 further comprising the step of displaying the trajectory data.

3. The method of claim 1 wherein the step of repeating steps c) through e) until agreement between the actual and estimated magnetic field measurements is deemed sufficiently close comprises the steps of:
   correlating the measured magnetic field values with each of the estimated magnetic field values for the array of sensors, by multiplying the estimated magnetic field values with the measured magnetic field values and summing the results over the array of sensors; and
   if one of the resulting correlations has a significantly larger value than the others and if it is greater than a predetermined threshold, declaring a detection for the location corresponding to the calculated values that resulted in the larger correlation value.

4. The method of claim 3 further comprising the step of displaying the trajectory data.

5. A method of detecting and localizing a magnetic dipole using an array of spatially distributed magnetic sensors, said method comprising the steps of:
   a) collecting a set of actual magnetic field measurements of a magnetic dipole using a plurality of magnetic sensors;
   b) filtering the actual magnetic field measurements using a predetermined filter;
   c) hypothesizing a trajectory for the magnetic dipole;
   d) determining a set of estimated magnetic field measurements that would be formed by a magnetic dipole moving along the hypothesized trajectory;
   e) filtering the estimated magnetic field measurements using the same predetermined filter;
   f) comparing the actual magnetic field measurements with the estimated magnetic field measurements;
   g) based on the comparison, hypothesizing a new trajectory for the magnetic dipole; and
   h) repeating steps d) through g) until agreement between the actual magnetic field measurements and the estimated magnetic field measurements is deemed sufficiently close.

6. The method of claim 5 further comprising the step of displaying the trajectory data.

7. Apparatus for detecting and localizing a magnetic dipole comprising:
   an array of magnetic sensors;
   processing means coupled to the array of magnetic sensors, for storing an estimate of the magnetic field signature to be detected by the array of sensors at each of a plurality of locations to provide an array of estimated magnetic field signals that are represented by fundamental magnetic dipole equations, for collecting magnetic field signals indicative of the magnetic field measured at each of the sensors in the presence of the magnetic dipole that is to be detected to provide measured magnetic field values, for removing spatial and temporal variations in the magnetic field measured at each of the sensors by temporally and spatially filtering the measured magnetic field signals, for correlating the measured magnetic field values with each of the estimated magnetic field values for the array of sensors by multiplying the estimated magnetic field values with the measured magnetic field values and summing the results over the array of sensors, for identifying the trajectory of the dipole if one of the correlations has a significantly larger value than the others and if it is greater than a predetermined threshold, and if the trajectory of the dipole corresponds to the location represented by the measured magnetic field signals that produced in the significantly larger value; and
   display means for displaying the location and velocity of the identified dipole.

* * * * *

UNITED STATES PATENT AND TRADEMARK OFFICE
CERTIFICATE OF CORRECTION

PATENT NO : 5,684,396

DATED : November 4, 1997

INVENTOR(S) : Stan Aks

It is certified that error appears in the above-identified patent and that said Letters Patent is hereby corrected as shown below:

Column 1. line 5, insert the following:

--This invention was made with Government support under Contract No. N66001-92-C-6023 awarded by the Department of the U.S. Navy. The Government has certain rights in this invention.--

Signed and Sealed this

Seventh Day of December, 1999

Attest:

Q. TODD DICKINSON

Attesting Officer

Acting Commissioner of Patents and Trademarks